(12) United States Patent
Paukshto et al.

(10) Patent No.: US 7,405,787 B2
(45) Date of Patent: Jul. 29, 2008

(54) LIQUID CRYSTAL DISPLAY WITH OFFSET VIEWING CONE

(75) Inventors: Michael V. Paukshto, Foster City, CA (US); Louis D. Silverstein, Scottsdale, AZ (US)

(73) Assignee: Nitto Denko Corporation, Osaka (JP)

( * ) Notice: Subject to any disclaimer, the term of this patent is extended or adjusted under 35 U.S.C. 154(b) by 92 days.

(21) Appl. No.: 10/613,328

(22) Filed: Jul. 2, 2003

(65) Prior Publication Data
US 2004/0189910 A1   Sep. 30, 2004

Related U.S. Application Data

(60) Provisional application No. 60/457,668, filed on Mar. 25, 2003.

(51) Int. Cl.
*G02F 1/1337* (2006.01)

(52) U.S. Cl. .................... 349/123; 349/96; 349/179; 349/180

(58) Field of Classification Search ............ 349/123, 349/96, 114, 179–180
See application file for complete search history.

(56) References Cited

U.S. PATENT DOCUMENTS

| | | | |
|---|---|---|---|
| 4,890,902 A | | 1/1990 | Doane et al. |
| 5,280,371 A | | 1/1994 | McCartney et al. |
| 5,830,976 A | * | 11/1998 | Sugimori et al. ............ 528/172 |
| 6,200,655 B1 | * | 3/2001 | Gibbons et al. ............. 428/1.2 |
| 6,380,995 B1 | | 4/2002 | Kim |
| 6,469,755 B1 | | 10/2002 | Adachi et al. |
| 7,190,416 B2 | * | 3/2007 | Paukshto et al. ............. 349/12 |
| 2002/0089621 A1 | * | 7/2002 | Suzuki ..................... 349/96 |
| 2002/0145689 A1 | * | 10/2002 | Kaneko .................... 349/114 |
| 2002/0192397 A1 | * | 12/2002 | Tsujimoto ................ 428/1.31 |
| 2005/0151905 A1 | * | 7/2005 | Kurtz et al. ............... 349/117 |

FOREIGN PATENT DOCUMENTS

| | | |
|---|---|---|
| EP | 0 448 713 A1 | 9/1991 |
| EP | 1 004 921 A1 | 5/2000 |
| WO | WO 01/81991 A1 | 11/2001 |

OTHER PUBLICATIONS

Y.Bobrov, L.Fennell, P.Lazarev, M.Paukshto, S.Remizov "Manufacturing of a Thin-Film LCD", The 2nd International Display Manufacturing Conference&Exhibition,Technical Digest, Seoul, Korea, Jan. 29-31, 2002.*

(Continued)

*Primary Examiner*—David C. Nelms
*Assistant Examiner*—Thanh-Nhan P Nguyen
(74) *Attorney, Agent, or Firm*—Westerman, Hattori, Daniels & Adrian, LLP.

(57) ABSTRACT

A liquid crystal display is provided which comprises a front panel comprising a front alignment layer having an alignment direction, a rear panel comprising a rear alignment layer having an alignment direction, and a liquid crystal layer between the front and rear alignment layers. The liquid crystal layer has a rotational twist angle of about 90° and a pre-tilt angle of not more then 2°. The alignment, material and thickness of the liquid crystal layer are such that at the mid-point of the rotational twist, the direction of liquid crystal directors coincide with an off-normal viewing direction of the liquid crystal display.

22 Claims, 11 Drawing Sheets

OTHER PUBLICATIONS

Ignatov, L.Ya.; Lazarev, P.I.; Nazarov, V.V.; Ovchinnikova, N.A. (OPTIVA Inc., San Francisco, CA, USA) "Thin Crystal Film Polarizers and Retarders"; Conference: Liquid Crystal Materials, Devices, and Applications VIII. San Jose, CA, USA, Jan. 21-22, 2002.*

Hansen, Glenn, et al., "*AMLCD Modeling And Display Performance At Image Quest Technologies*", 15th AIAA/IEEE Digital Avionics System Conference (DASC). Atlanta, GA.,IEEE, vol. Conf. 15, (Oct. 1996) pp. 239-243. (XP-010202023).

Lazarev, P., et al., "*E-Type Polarizers and Retarders*", Proceedings of the SPIE, Bellingham, VA, vol. 4819, (2002), pp. 46-55. (XP-002261227).

Paukshto, M., et al., "*18.1: Two Novel Applications of Thin-Film E-Type Polarizers*", SID 02 Digest, 2002, pp. 722-725. (XP-001134316).

Wu, S.T., et al., *Reflective Liquid Crystal Displays*, 2001, John Wiley and Sons Ltd. (abstract only).

Lueder, E., et al., *Liquid Crystal Displays: Addressing Schemes and Electro-Optical Effects*, 2001, John Wiley and Sons Ltd. (abstract only).

Blinov, L.M., *Electro-Optical and Magneto-Optical Properties of Liquid Crystals*, New York: John Wiley and Sons Ltd. Brand, HR 1989. (abstract only).

Chinese Office Action dated Jun. 8, 2007 issued in corresponding Application No. 20048008006.8.

* cited by examiner

LIQUID CRYSTAL DISPLAY WITH OFFSET VIEWING CONE

CROSS REFERENCES TO RELATED APPLICATIONS

This application claims priority to the U.S. patent application Ser. No. 60/457,668, filed Mar. 25, 2003, the disclosure of which is hereby incorporated by reference.

FIELD OF THE INVENTION

This invention relates in general to the field of liquid crystal devices, and in particular to liquid crystal displays with offset viewing cone.

BACKGROUND OF THE INVENTION

Devices designed for off-normal, directed optical characteristics such as transmission, reflectance, contrast, brightness etc. are well known in the prior art. The optical anisotropy of nematic liquid crystals makes them ideal for use in these devices. The high level of development of liquid crystal materials and application methodology provide a solid technological foundation and facilitate their use in directed, light-modulating optical devices.

In liquid crystal displays, light from front- or backlighting system or from ambient light sources sequentially passes through a plurality of functional layers. In the case of transmissive LCDs, the functionality of the display requires at least a polarizer, a liquid crystal (LC) layer confined between transparent electrodes, and another polarizer. Reflective LCDs may be constructed such that either one or two integral polarizers are required. Other required elements include alignment layers that provides orientation of directors of liquid crystal molecules on the boundaries of the liquid crystal and transparent substrates to protect the liquid crystal and other layers confined between them from mechanical and other damages. Reflective LCDs include an additional reflective layer. Additionally, a plurality of functional layers such as retardation plates, color filters, planarization and protective layers, insulating layers and other layers may also be included in the display depending on the technical requirements to the display and its functions.

Many types of liquid crystal configurations are known which are capable of modulating the intensity of light and providing controlled contrast for the display of images. The most common and generally most effective LC devices for this function are based on liquid crystals in the nematic phase, operating with the use of the twist effect, that is, a twist of the polarization plane of the light passing through a layer of liquid crystal material. The principle of operation of a twisted-nematic liquid crystal cell is based on the use of a pair of polarizers employed together with a voltage-driven LC cell. A front polarizer polarizes the incident light. The polarization plane of the polarized light is twisted through a certain angle as polarized light passes through the liquid crystal layer before it meets a second polarizer. The second polarizer is also called the analyzer. A change in the voltage across the liquid crystal results in a change in a twist angle of the polarization plane, as light passes through the liquid crystal layer. This allows the light intensity to be controlled at the exit from the display by changing an angle between the light polarization plane at the exit from the liquid crystal and the transmission axis of the analyzer.

The capability to modulate the intensity of the light passing through the functional layers of the display is realized with the liquid crystal confined between transparent electrodes, which are in turn confined between the transparent substrates and the entrance and exit polarizers. Depending upon the particular LCD application, the entrance and exit polarizer may be oriented with their transmission axes crossed, in which case the operating mode is called a normally-white (NW) mode, or the two polarizers may be oriented with their transmission axes aligned parallel to one another, in which case the operating mode is designated as normally-black (NB) mode. In the case of a twisted-nematic (TN) LCD operated in the NW mode, if a voltage applied to the LC layer with the aid of electrodes completely suppresses the twist effect, the polarization of light created by the first polarizer remains unchanged and the light is absorbed in the second polarizer oriented perpendicularly to the first one (crossed polarizers). On the contrary, when no voltage is applied to the LC, the polarization plane of the light is rotated so that the beam passes through the second polarizer without absorption. In the case of a TN LCD operated in the NB mode, the relations between the applied voltage and light throughput are the reverse of those described for the NW mode.

The above scheme can exhibit significant variations depending on features of the LCD design. There are two types of LCDs: reflective and transmissive. Reflective LCDs use the light from ambient sources and employ no special backlighting systems, thus consuming minimum energy. Transmissive displays are provided with backlighting systems employing light sources situated on the side opposite to an observer. A reflective display with semitransparent mirror and a backlighting system behind it can operate in both reflection and transmission modes. LCDs of this hybrid type are called transmissive-reflective or transflective LCDs.

In describing LCDs, it is convenient to differentiate between front and rear sides. The front side is that facing the viewer and, in the case of reflective LCDs, the front side also faces the source(s) of ambient illumination. The rear side is opposite to the front side and, in the case of transmissive LCDs, the rear side faces the backlighting system. The set of layers in the LCD structure situated in front of the LC layer is frequently referred to as the front panel, while the layers behind the LC layer are called the rear panel. Accordingly, the like functional layers situated in rear and front panels are specified as "rear" and "front", such as rear and front substrates, rear and front electrodes, etc.

Many modern liquid crystal displays use the liquid crystal in the so-called mixed mode. The term "mixed mode" designates the mode of the liquid crystal when the Mauguin condition is violated, such that the liquid crystal layer no longer functions as a simple polarization rotator but rather operates as a "mixture" of both a polarization rotator and a birefringent slab or waveplate. In this case, the liquid crystal layer retardation is close to the light wavelength by the order of magnitude:

$$(n_e - n_o)d \approx \lambda$$

$n_e$ and $n_o$ denote the refractive indexes for extraordinary and ordinary rays in the liquid crystal, respectively, d is the thickness of the liquid crystal, $\lambda$ is the visible light wavelength (400-700 nm). Here, the retardation of the liquid crystal layer denotes the product of the liquid crystal layer thickness and the difference between extraordinary and ordinary rays refractive indices (i.e., the birefringence of the liquid crystal layer). It should be noted that satisfaction of the Mauguin condition generally requires that the retardation of the liquid crystal layer be much greater than the wavelength of visible light, a condition that is seldom fulfilled given the refractive indices of most liquid crystal materials and the desirability of small liquid crystal cell gaps.

The mixed modes allow development of the liquid crystal light devices with high brightness, high multiplexing, enhanced angular characteristics, better color rendering and other advantageous features. In order to achieve the advantages, the parameters of the liquid crystal display require careful tuning. The physical reason here is the sophisticated light transformation in the liquid crystal. For example, in the general case the linearly polarized light transmitted through the mixed-mode liquid crystal is transformed to elliptical polarization with the additional result that the polarization state at the output of the liquid crystal layer exhibits a strong wavelength dependency. Therefore, a clear, achromatic light output in the optically active state of the liquid crystal display (bright state for the NW mode or dark state for the NB mode) is not possible in the general case.

In order to realize the performance advantages of mixed-mode LCD operation and mitigate the described shortcomings, numerous theories and concepts were developed. Herewith we denote the parameters engaged in the tuning of the liquid crystal mode in order to obtain the best optical and viewing angle performance. Liquid crystal layer parameters engaged are the twist angle, pre-tilt angle, and the retardation determined here as the product of the thickness and the birefringence of the liquid crystal layer. Principal tunable parameters for the polarizers and the alignment layers are the angles between front and rear polarizer transmission axes and, respectively, the rubbing directions of the front and rear alignment layers. Usually the liquid crystal birefringence, the liquid crystal layer thickness, the twist angle and polarizers angles are isolated as the main parameters, although the pre-tilt angle also plays a role in adjusting the optical and viewing angle performance of the LCD operated in a mixed mode.

In addition, the use of different optical phase compensators—i.e., optical retarders—can affect the LCD optical performance. The retarders are used in order to widen the viewing angle of the liquid crystal devices, to obtain the better contrast and throughput luminance, to provide better color rendering, and to enhance other angular characteristics, etc. The different kinds of optical retarders such as stretched-film quarter- and half-wave plates, twist-discotic liquid crystals, Fuji-film and so on are designed to enhance various characteristics of the liquid crystal optical devices.

In the context of the background, all of these enhancements are of two different means. On the one hand, the widening of the contrast viewing angle or viewing cone of any type of liquid crystal device would give a technical solution for some of the particular tasks in the field of the disclosed invention. Here we touch the intersection between the spheres of use of directional light/contrast modulators and wide-angle light/contrast modulators. Although the use of the devices with wide viewing angle is possible in the cases when a specific off-normal viewing direction is required, this is generally not the best solution due to excessive light losses at non-viewable directions as well as unnecessary complexity and cost. On the other hand, in most cases the use of LCDs, which are specially designed and optimized for specific off-normal viewing directions should be substantially less expensive and more practical. The technical art considering the modification of the liquid crystal cell viewing properties by tuning the parameters of the liquid crystal itself and related details could be quite useful for the disclosed invention. The reason is the simplicity of the described solutions.

U.S. Pat. No. 5,280,371 describes a method using a directional diffuser to gather light passing trough a liquid crystal display device in an inclined direction. The method consists of the use of a microlens array in conjunction with a conventional lambertian light diffuser installed sequentially along the light path. The lenses in the array possess parallel optical axes, thus having one common optical axis. This combination is inserted into the plurality of layers of the liquid crystal display in such a way that the microlens array is turned to the light source, and the lambertian diffuser is placed immediately behind the front glass substrate of the liquid crystal. When the common optical axis of the microlens array is turned from the parallel with the light path in the liquid crystal display, the area with maximum concentration of light is turned and aligns in parallel with the optical axis of the microlens array. The main drawback of the device is the technological complexity of the microlens array manufacturing and the associated cost.

U.S. Pat. No. 6,380,995 B1 describes a device, the directional viewing characteristics of which are realized with the aid of a reflective electrode layer disposed on an uneven surface. This electrode has a transparent portion substantially facing in a main viewing angle direction. The main disadvantage of the device is it can only be used in reflective type liquid crystal displays. Transmissive type liquid crystal displays and the other liquid crystal devices without reflective functional layers are not compatible with this approach. In addition, the fabrication of a reflective, partially transparent electrode with an uneven surface structure is technically challenging and expensive.

U.S. Pat. No. 4,890,902 describes a specially designed optical light modulating material comprising an organic resin with microdroplets of liquid crystal material incorporated into a synthetic resin matrix. The index of refraction of the matrix is matched or mismatched to an index of refraction of the liquid crystal optical axis within the microdroplets so that when the microdroplet LC director is aligned relative to a surface of the material, maximum transmission of light occurs at a selected oblique angle relative to the surface of the material or a selected narrow angle about the perpendicular of the material. The use of this material in liquid crystal cells, light control devices for windows and displays provides the devices with an oblique viewing angle, therefore having the potential capability to direct the light to off-normal directions. The drawback of the polymer dispersed liquid crystal or PDLC, is the relatively high operating voltage, low contrast ratio and a highly scattering light characteristic in the voltage off state leading to high levels of diffuse reflection.

SUMMARY OF THE INVENTION

Accordingly, one general objective of this invention is to eliminate the drawbacks and uncertainties of known devices such as cumbersome backlighting system, restriction on liquid crystal materials, low image contrast in the viewing direction, excessive light loss and diffuse surface reflection, complicated manufacturing process and associated high cost.

Another objective of the present invention is to provide a liquid crystal display with directed, offset viewing cone that can be manufactured using traditional and well-developed methods of liquid crystal technology.

A further objective is to provide a transmissive, reflective or transflective type of liquid crystal display device capable of producing images that have the highest contrast ratio and brightness in the directions off-normal from the display.

These and other objectives are achieved by the liquid crystal display of the invention which comprises a front panel comprising a front alignment layer having an alignment direction, a rear panel comprising a rear alignment layer having an alignment direction, and a liquid crystal layer between the front and rear alignment layers. The liquid crystal layer has a rotational twist angle of about 90° and a pre-tilt angle of not more than 2°. The alignment, material and thickness of the liquid crystal layer are such that at the mid-point of the rotational twist, the direction of liquid crystal directors coincide with an offset viewing direction of the liquid crystal display.

BRIEF DESCRIPTION OF THE DRAWINGS

The invention will be more clearly understood from the following description when read in conjunction with the accompanying drawings in which.

DETAIL DESCRIPTION OF THE INVENTION

The present invention provides a highly effective liquid crystal display with a directed, offset viewing cone, which is simple and easy to fabricate. The liquid crystal display of the invention can be transmissive, reflective or transflective, and is capable of deflection of the viewing cone of maximal image contrast and brightness to a selected off-normal direction. Particularly, the transmissive variant allows deflection of the viewing cone from the straight light path, while the reflective variant allows deflection of the viewing cone from the mirror-like light path. This capability can be used in image display devices of various purposes, especially where such devices must be located in an offset position relative to the viewer.

The liquid crystal display of the invention comprises a plurality of layers, particularly, liquid crystal, substrates, polarizers, electrodes, and alignment layers etc. The liquid crystal layer is substantially the twisted nematic liquid crystal, and the pre-tilt angle is not more then 2°. The alignment, thickness and material of the liquid crystal layer are appropriately chosen in order to provide a desired offset of the viewing direction of the display. In particular, the viewing offset direction of the liquid crystal display coincides with the direction of the liquid crystal molecules directors at the midpoint of the rotation twist.

Figure 1A:
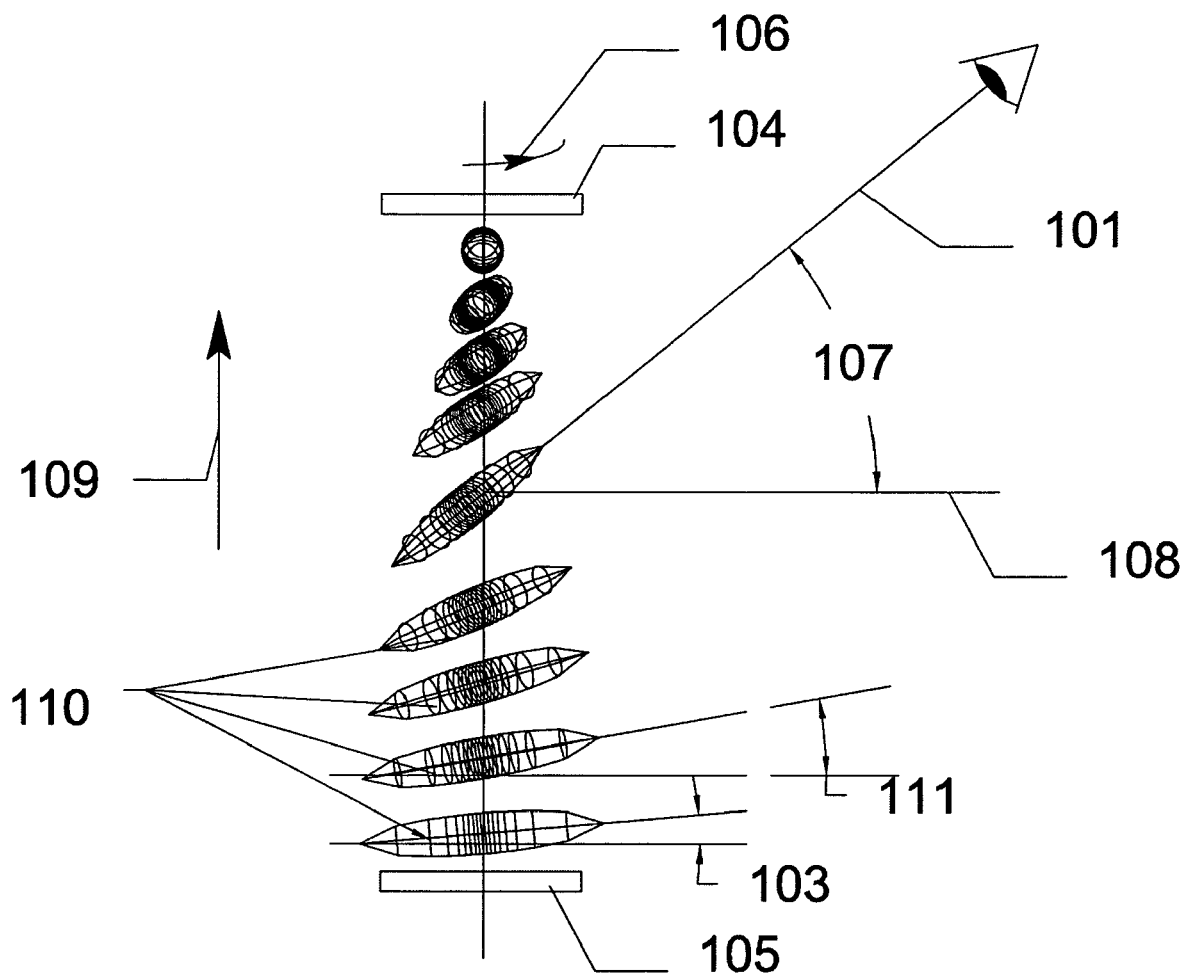
FIG. 1A is a schematic showing the directors of liquid crystal molecules in the on-state of the liquid crystal.
Figure 1B:
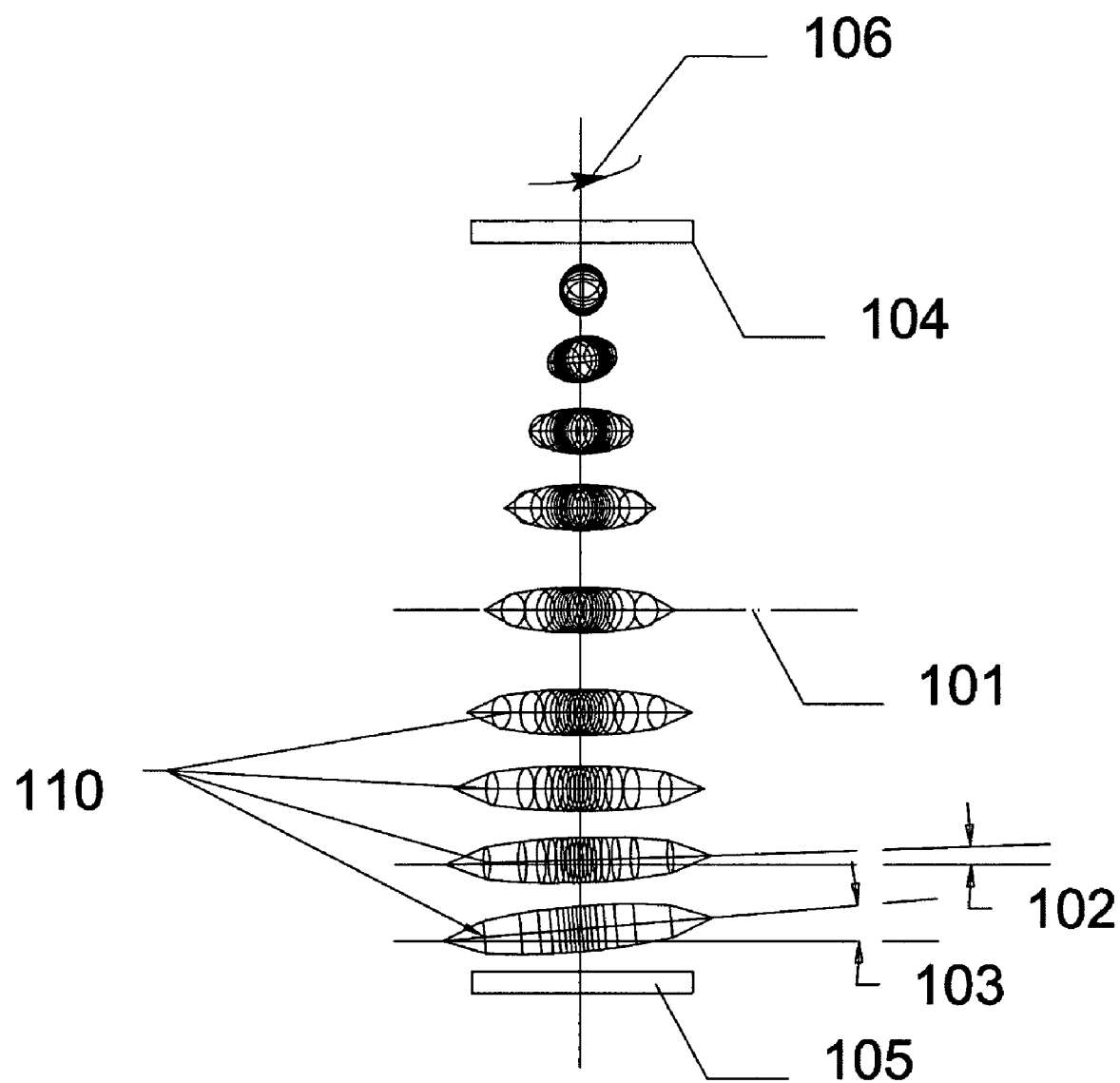
FIG. 1B is a schematic showing the directors of liquid crystal molecules in the off-state of the liquid crystal.

The present invention is illustrated in more details with reference to FIGS. 1A and 1B. The directors of the liquid crystal molecules in the on-state of the liquid crystal is shown in FIG. 1A. The directors of the molecules in the off-state of the liquid crystal is shown in FIG. 1B. The molecules of the liquid crystal 110 are placed between alignment layers 104 and 105. The difference between the on-state and the off-state is based on the voltage applied to the liquid crystal. In the off-state, the value of voltage is zero, while in the on-state, a non-zero voltage is applied to create an electrical field 109 inside the liquid crystal. This electric field forces the molecules to turn along the electric field 109. The directors of the molecules in the on-state is defined by the twist rotation 106 of the molecules, by the interaction of the molecules with electric field and by the pre-tilt derived tensions described below. In the off-state, only the pre-tilt interaction and the twist rotation are involved.

The liquid crystal molecules adjacent to the alignment layer 105 have approximately the same pre-tilt angle 103 in the off-state and on-state due to the strong interaction with adjacent alignment layer 105. The interaction between the molecules extends the tilt from the layers adjacent to the alignment layer into the depth of the liquid crystal. In the off-state, the pre-tilt angle 102 decreases as the molecules lie further from the alignment layer, and most of the liquid crystal molecules follows the twist rotation only, as shown in FIG. 1B. The director 101 of the molecule in the midpoint of the rotation twist lies in the horizontal direction.

In the on-state, the voltage azimuthally rotates the directors of the liquid crystal molecules. Consequently, the tilt angle 111 increases as the molecules lie further from the alignment layer. The interaction of the pre-tilt, electrical field and the twist rotation aligns the director 101 of the molecule in the midpoint of the rotation twist at angle 107 of horizontal direction 108. In this configuration, the light will be distributed in the off-normal viewing direction. The maximum image contrast will be achieved in the direction of the director of the molecule in the midpoint of the rotation twist.

Figure 2A:
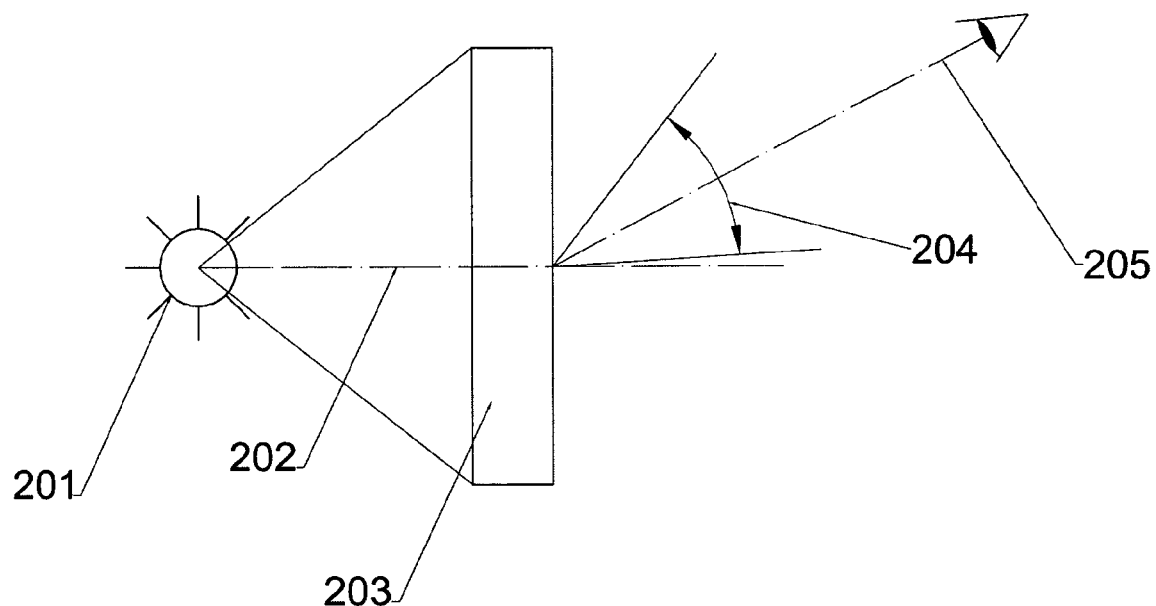
FIG. 2A is a schematic showing a transmissive liquid crystal display with an offset viewing cone.
Figure 2B:
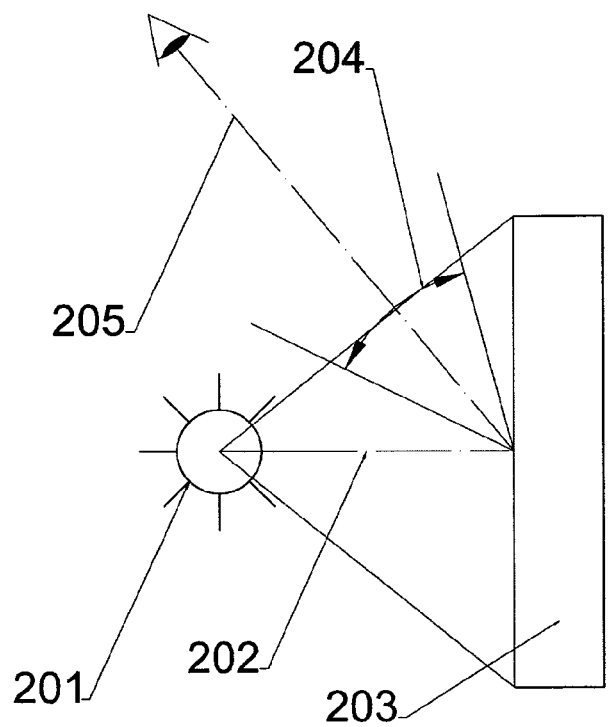
FIG. 2B is a schematic showing a reflective liquid crystal display with an offset viewing cone.

FIGS. 2A and 2B show the general operational concepts of the liquid crystal displays with offset viewing cones. FIG. 2A shows the transmissive operation, where the device is positioned on the light path between the light source and the light detector (or human eyes). Here, the liquid crystal display with offset viewing cone steers the cone of transmitted light going through the cell such that the viewing cone of maximal image contrast is centered around some selected off-normal direction. In the case of reflective operation as shown in FIG. 2B, the liquid crystal display with offset viewing cone reflects the cone of light such that the viewing cone of maximal image contrast is centered around the selected off-normal direction. The offset of viewing means that the maximum image contrast is shifted from the normal to the display.

The transmission axes of the two polarizers can be perpendicular or parallel to each other, forming a normally-white or normally-black display respectively.

The polarizer of a liquid crystal display can be of either E-type or O-type. An O-type polarizer is a dichroic polarizer where the extraordinary ray is suppressed. An E-type polarizer is a polarizer where the ordinary ray is suppressed. Conventional thin film polarizers used in liquid crystal displays are based on iodine organic compounds and mainly of O-type. Dichroic dye based polarizers often represent E-type polarizers. A good and practical example of dichroic dye based polarizers is the thin crystal film (TCF™) polarizers available from Optiva, Inc. in South San Francisco, Calif.

The TCF polarizers are made of an optically anisotropic dichroic liquid crystal film. The possibility of using this film as a material for making polarizers is related to its characteristic properties including extremely small thickness (1 micron and less), low temperature sensitivity, highly anisotropic refractive indices, favorable angular characteristics, and high polarizing ability at oblique angles.

The above properties are related to the special features of the materials employed and the method used for forming the liquid crystal film. A special molecular-crystalline structure of the thin crystal film is formed by crystallization of a liquid crystal phase, containing at least one organic substance capable of forming a stable lyotropic or thermotropic liquid crystal phase, upon application of the liquid crystal onto an appropriate substrate, alignment, and drying. The organic substance in the anisotropic thin crystal film comprises at least one organic compound, the formula of which includes (i) at least one ionogenic group ensuring solubility in polar solvents for obtaining a lyotropic liquid-crystalline phase, and/or (ii) at least one nonionogenic group ensuring solubility in nonpolar solvents for obtaining a lyotropic liquid-crystalline phase, and/or (iii) at least one counterion, which is either retained or not retained in the molecular structure in the course of the material formation.

The selection of the base material for this optically anisotropic dichroic crystal film is determined by the presence of a developed system of $\pi$-conjugated bonds in conjugated aromatic rings and by the presence of groups (such as amine, phenol, ketone, etc.) lying in the plane of the molecule and entering into the aromatic system of bonds. Such a selection can be performed so as to take into account the requirements with respect to the transmission spectrum of the film in the visible range. Using dyes as the initial compounds also provides possibility of using thin crystal film polarizers as correcting color or neutral filters and/or as ultraviolet or infrared filters. The selection between these possibilities is determined by the technical task and available materials, etc.

When dissolved in an appropriate solvent, such organic compounds form a colloidal system (lyotropic liquid crystal) in which molecules are aggregated into supramolecular complexes constituting kinetic units of the system [Patent Application RU 2,000,104,475 of 25.00.00]. This lyotropic liquid crystal phase is essentially a precursor of the ordered state of the system, from subsequent alignment of the supramolecular complexes and removal of the solvent.

The process of the polarizer orientation leads to the formation of a surface microroughness characterized by a certain special direction. This circumstance allows such polarizers to be used as alignment layers.

In the optically anisotropic dichroic crystal film, the molecular planes are parallel to each other and the molecules form a three-dimensional crystal structure, at least in a part of the crystal. Optimization of the production technology may allow the formation of an optically anisotropic dichroic single crystal film. The optical axis in this single crystal is perpendicular to the plane of molecules. Such thin crystal films possess a high degree of anisotropy and exhibit, at least in one direction, a high index of refraction and/or a high absorption coefficient.

The required anisotropy of the absorption coefficients and the refractive indices, as well as the necessary orientation of the principal axes (i.e., the optical properties of the electrooptical anisotropic thin crystal film in a multilayer structure) can be ensured by establishing a certain angular distribution of molecules in the polarizing film at the substrate surface. It is also possible to mix colloidal systems (which leads to the formation of combined supramolecules) so as to obtain the crystal films possessing intermediate optical characteristics. In the optically anisotropic dichroic crystal films obtained from mixed colloidal solutions, the absorption coefficient and the refractive index can take various values within the limits determined by the initial components. Such a mixing of different colloidal systems with the formation of combined supramolecules is possible due to the coincidence of one characteristic dimension (interplanar spacing of 3.4±0.2 Å) for the organic compounds employed.

The possibility of controlling the optical properties of the thin crystal film by the aforementioned methods in the course of fabrication allows the layer characteristics to be adjusted according to the requirements of various particular problems. For example, it is possible to modify the absorption spectrum of the polarizer, which can provide for the improved color rendering and achromatism of the display. The birefringent films can be used as phase retarders with preset phase shift at a given wavelength. By changing the optical anisotropy of the films, it is possible to improve angular characteristics of the liquid crystal displays with thin film crystal polarizers.

The thickness of the optically anisotropic dichroic crystal film is determined by the content of solid substance in the applied solution. During the formation of such layers, a technological parameter conveniently controlled under commercial production conditions is the solution concentration. The degree of crystallinity of the final crystal film can be monitored by X-ray diffraction and/or by optical methods. The surface of substrates onto which the thin crystal films are applied can be subject to additional processing to ensure homogeneous wetting of the surface (rendering the surface hydrophilic). The possible treatments include mechanical processing, annealing, mechanochemical treatment, etc. Such treatments may lead to a decrease in the film thickness and to an increase in the degree of ordering. An additional increase in the degree of ordering can be provided by special anisotropic alignment structures formed by mechanical processing of the substrate surface.

The optical dichroism of the film makes it possible to use such polarizers as phase retarders to improve the contrast ratio and/or angular characteristics of liquid crystal displays.

In another embodiment of the invention, at least one polarizer of the cell is placed between the substrates and therefore the specified polarizer is essentially an internal polarizer. The internal polarizer utilization can widen the viewing angle of the cell, lower switching time of the cell, enhance brightness of the cell, obtain better color rendition and further improve the cell performance due to the lowering of the cell thickness. In another embodiment, the internal polarizer can carry an additional function such as an alignment layer, or a color correcting layer, or retarder, or combine at least two of the specified functions in addition to the polarizing function. The combination of any type described is possible when the internal polarizer is made from a dichroic dye material that is aligned in order to obtain the polarization effect.

Furthermore, a decrease of the cell driving voltage can be obtained when the internal polarizer is made from a material with high dielectric permittivity. In order to achieve this result the internal polarizer should be placed between the electrode and the substrate of the panel. Thus the elimination of the material with the high permittivity from the space between electrodes will decrease the voltage required to switch the liquid crystal cell from the twisted to untwisted state.

In another embodiment of the invention, the liquid crystal cell operates in the reflective liquid crystal display mode and thus the plurality of cell's layers includes a light reflective layer. In another embodiment, the liquid crystal cell works in the transflective liquid crystal display mode and therefore the specified reflective layer will be partially transparent in order to transmit light from an integral backlight source.

For the reflective and transflective modes of the liquid crystal display, the necessity to eliminate or minimize the interference in the layers of the liquid crystal cell requires the addition of light scattering to the functionality of the plurality of the liquid crystal layers. In the embodiment with a reflective layer, this reflective layer is diffusely reflective, thus providing the light scattering function in addition to the light reflecting function. On the other hand, the use of a specularly reflective layer is of practical value too, because it provides a higher brightness and contrast display while the light scattering can be realized with other technical means.

The simplest way to achieve the interference reduction is by addition of the special light-scattering layer to the plurality of layers of the liquid crystal cell. In another embodiment, micro-droplets of light scattering material are added to the liquid crystal layer.

In another embodiment, anti-reflective and/or anti-glare coating is disposed on the surface of the liquid crystal cell. This embodiment gives the enhancement of the viewing characteristics by reduction of specular front surface reflections. In another embodiment, the aforementioned light scattering layer is disposed on the surface of the reflective cell as the light scattering coating to accomplish an anti-glare function.

The use of additional layers may be necessary either to enhance the viewing properties of the liquid crystal or to provide some auxiliary function. The present invention is capable of incorporating any of the functional layers described herewith, and two or more described layers, as well as layers combining functions of the layers described herewith.

The adhesive layer(s) usually bind the cell layers or bind the cell and some external object. The optical retarders are the birefringent layers that are sometimes necessary to enhance the viewing characteristics of the LCD cell to improve viewing angle, contrast and brightness, color and grayscale reproduction, etc. The isolating layers are added to protect cell from the electrical disruption. The protective layers are used to protect the cell layers from outer damage, scratching, or to prevent disruptive interactions between layers. The color filters are used to color the light exiting from the lighting system, either to correct the color gamut of the display, or to provide the display with color image displaying capability. The last case actually requires a patterned matrix of color filters.

In order to intensify the directional effect of the invention, special optical layers can be added to the cell. These layers can be an array of light-directing elements such as optical waveguides or lenselets, a diffraction grating, or any other layer providing additional collimation of the light passing through the cell. In another embodiment, a backlighting system providing collimated light can be used to provide an improvement when combined with other optical layers for light guiding.

FIG. 1A and FIG. 1B show the configuration of the liquid crystal molecules in the liquid crystal display with offset viewing cone of the invention in the on-state and off-state, respectively, where the reference numbers represent the following: 101—the director of the molecule in the midpoint of the rotation twist in the off-state of the liquid crystal, 103—the pre-tilt angle of the molecule adjacent to the alignment layer, 102—the pre-angle tilt of the molecule placed next to the molecule adjacent to the alignment layer in the off-state, 104, 105—alignment layers, 106—direction of the 90° rotation twist, 107—the angle of viewing offset, 108—the horizontal direction in the midpoint of the rotation twist, 109—the direction of the electrical field, 110—the liquid crystal molecules, 111—the pre-angle tilt of the molecule placed next to the molecule adjacent to the alignment layer in the on-state.

FIG. 2A presents a transmissive liquid crystal display with offset viewing cone, where the reference numbers represent the following: 201—light source, 202—initial light path cone, 203—light-directing liquid crystal cell, 204—contrast viewing cone after the liquid crystal light-directing cell, 205—the central angle of the contrast viewing cone produced by the liquid crystal light-directing cell. The figure shows the contrast viewing cone after the cell has shifted the center of the viewing volume relative to the initial direction.

FIG. 2B presents a reflective liquid crystal display with offset viewing cone. FIG. 2B shows contrast viewing cone after it is re-directed by the liquid crystal display relative to the initial direction. The viewing cone offset in the case of the reflective cell refers to a re-direction from the path of the mirror-reflected light.

Figure 3:
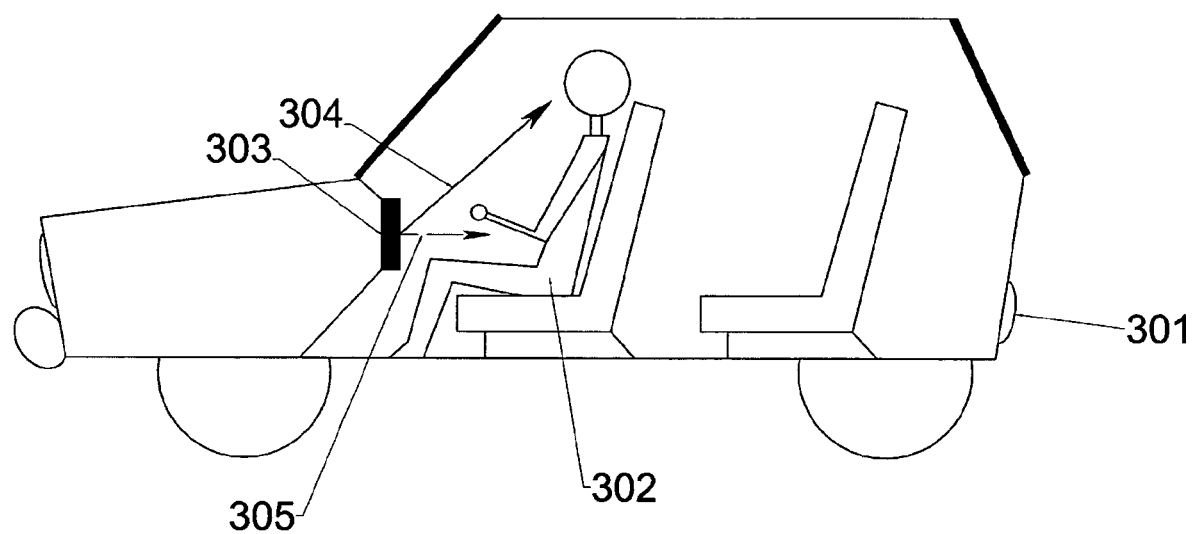
FIG. 3 is a schematic showing an automotive instrument panel application of the liquid crystal display with offset viewing cone.

FIG. 3 presents an application of the liquid crystal display with offset viewing cone for an automotive instrument panel, where the reference numbers represent the following: 301—the car, 302—the driver's body, 303—the control panel of the car equipped with the liquid crystal display with offset viewing cone light directing cell, 304—the off-normal direction of driver view, 305—the unused direction of view normal to the cell surface.

Figure 4:
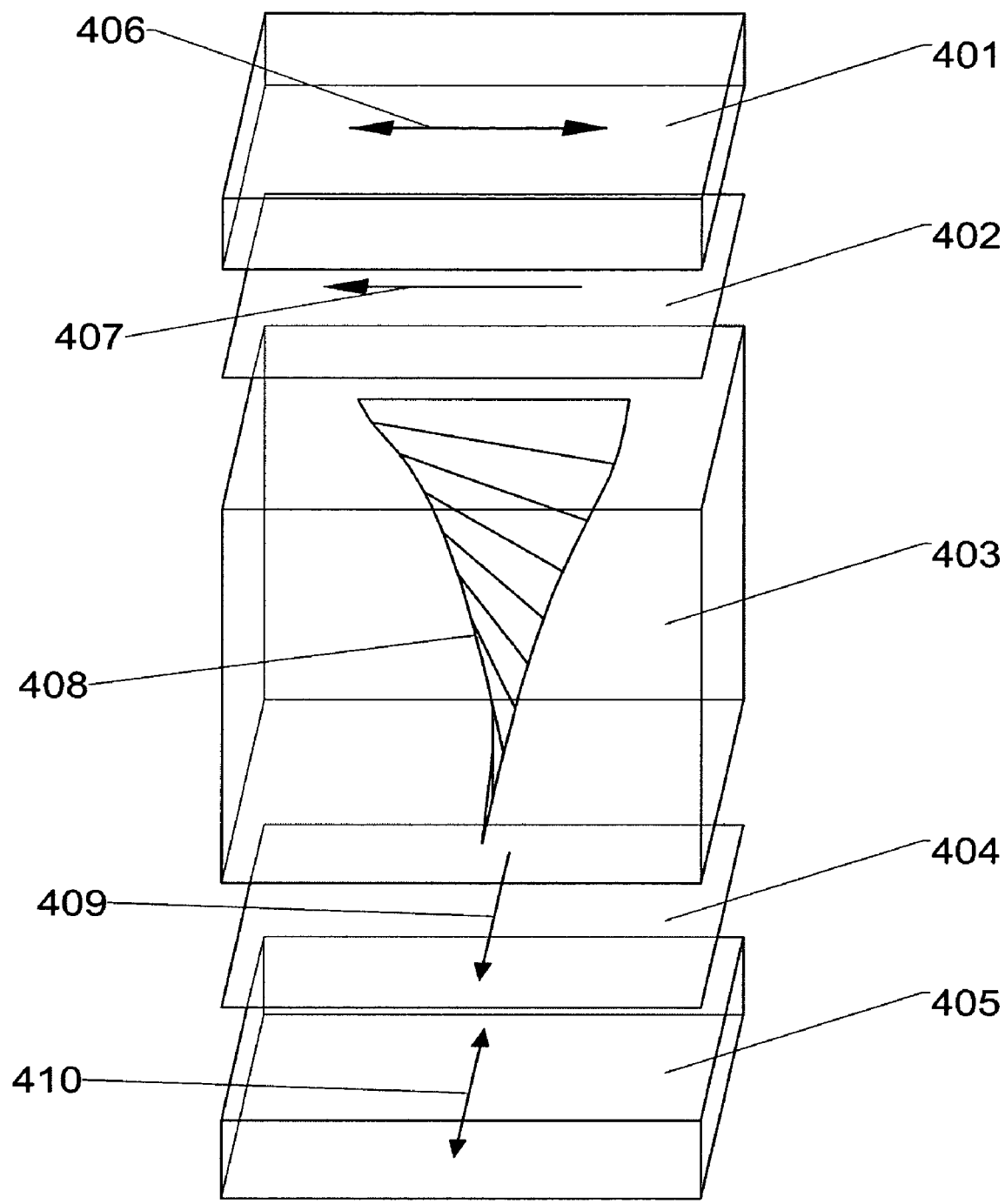
FIG. 4 is a schematic showing the order and mutual arrangement of the layers of a liquid crystal display with offset viewing cone.

FIG. 4 shows the order and mutual arrangement of the layers of the liquid crystal display with offset viewing cone, where the reference numbers represent the following: 401—the polarizer, 402—the alignment layer, 403—the liquid crystal layer, 404—the alignment layer, 405—the polarizer, 406—the polarizer transmission axis, 407—the rubbing direction of the alignment layer, 408—the spiral structure illustrating the 90° twist of the liquid crystal molecules, 409—the rubbing direction of the alignment layer, 410—the polarizer transmission axis. The transmission axis of each polarizer is parallel to the rubbing direction of the closest alignment layer, and the rubbing direction of the alignment layer defines the alignment of the molecules' directors in the liquid crystal. This illustration describes the alignment of a normally-white LC cell in the e-mode configuration (i.e., polarizer transmission axes aligned parallel with the LC director). The configuration shown in FIG. 4 is for illustrative purpose and not intended to limit the invention in any way. Other modes and alignments are also possible.

Figure 5:
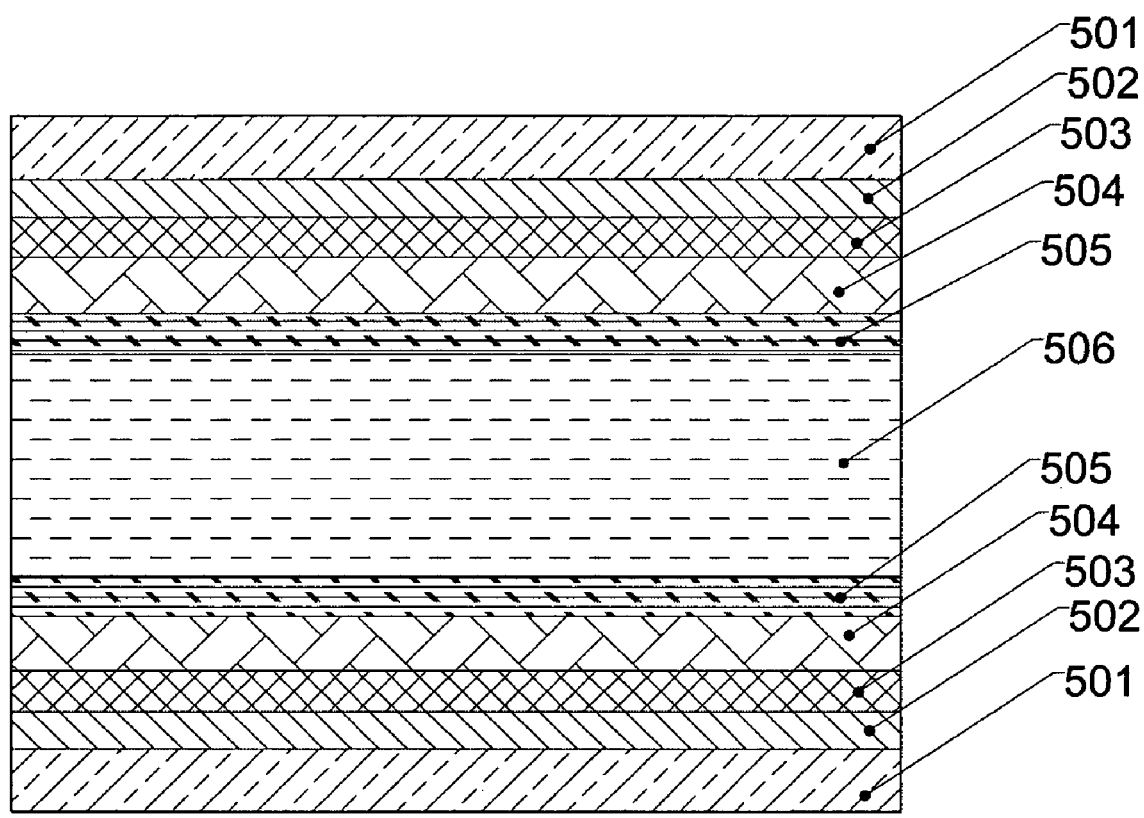
FIG. 5 is a schematic showing the layer structure of a liquid crystal display with offset viewing cone in accordance with one embodiment of the present invention.

FIG. 5 illustrates the layer structure of the liquid crystal display with offset viewing cone according to the present invention, where the reference numbers represent the following: 501—glass, 502—ITO electrode, 503—$SiO_2$ insulating layer, 504—thin crystal film, 505—alignment layer, 506—liquid crystal layer.

Using the LCD structure shown in FIG. 5, three examples were performed. Table 1 summarizes the main parameters used in the first example, where TCF NO 15 internal polarizers available from Optiva, Inc. were used in a 90 degree TN configuration operated in the NW mode (crossed polarizers). Table 2 summarizes the main parameters used in the second example with the same design as in example 1 but with conventional external polarizers. Table 3 summarizes the main parameters used in the third example where TCF N021 internal polarizers available from Optiva, Inc. were used in a 90-degree TN configuration operated in the NB mode (parallel polarizers).

Figure 6:
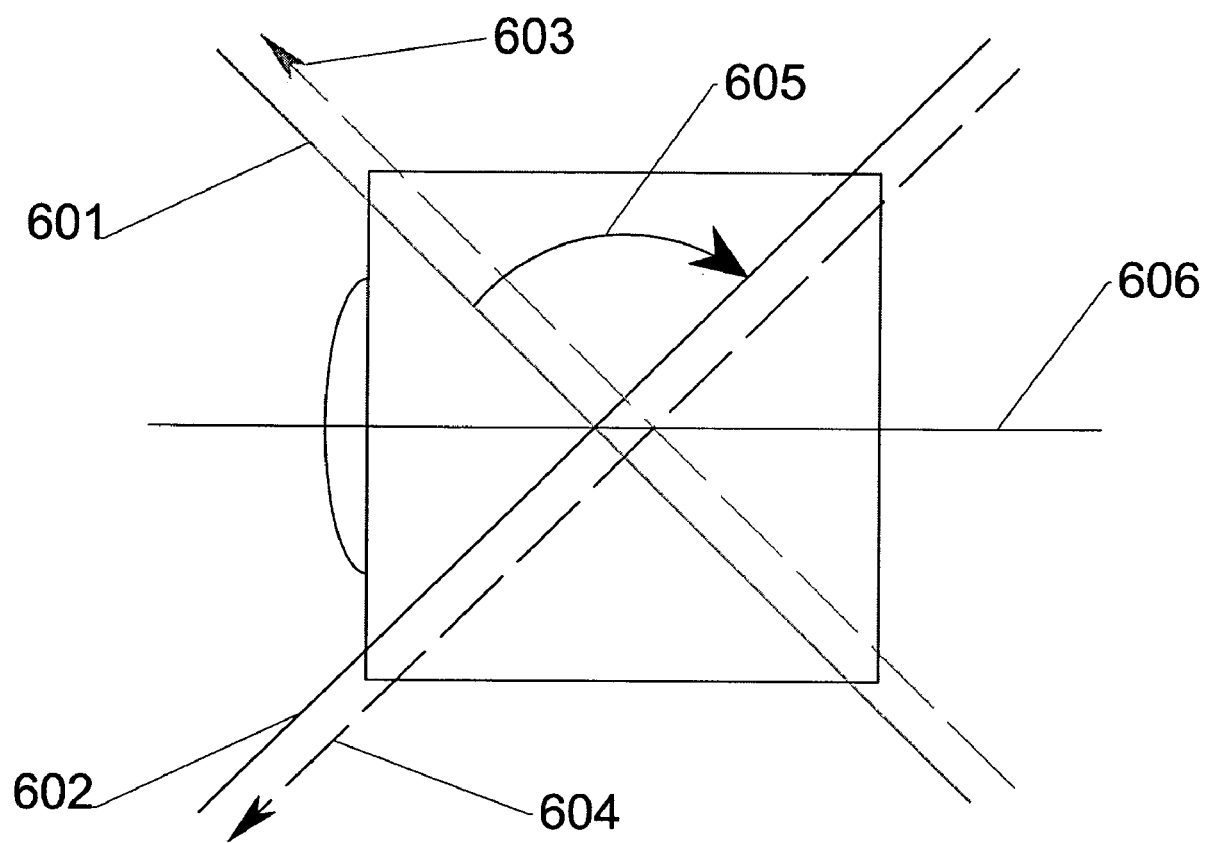
FIGS. 6-7 are schematics showing the mutual orientation of the polarizers and the liquid crystal rubbing directions in accordance with one embodiment of the present invention.

FIG. 6 show the LC rubbing directions and polarizer orientations in the first and second examples where the reference numbers represent the following: 601—polarizer transmission axis at the rear side, 602—polarizer transmission axis at the front side, 603—rubbing direction at the rear side, 604—rubbing direction at the front side, 605—twist direction, 606—glass axes.

Figure 7:
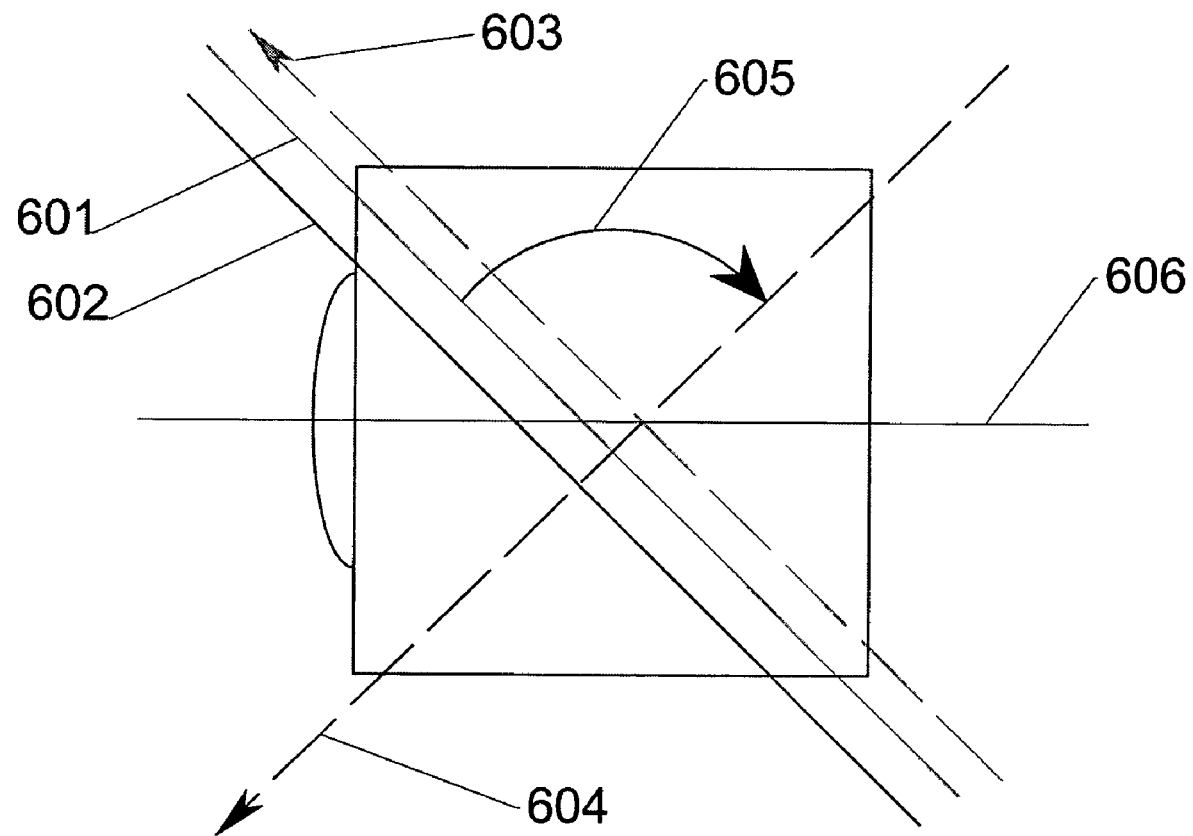

FIG. 7 presents the mutual orientation of the polarizers and the liquid crystal rubbing directions in the third example of the invention.

TABLE 1

Basic characteristics of the first Optiva design.

| Materials | Type | Thickness | Ref. indices |
|---|---|---|---|
| ITO | 100 ohm | 30 nm | 1.85 @ 633 nm |
| SiO2 | | 75 nm | 1.57 @ 633 nm |
| PI | | 70 nm | 1.653 |
| LC | MLC-7700-100, 2 deg. pre-tilt, 1.45 V-2.5 V multiplex, 1/4 duty cycle, 7.6 micron cell gap | | |
| Glass | | 0.7 mm | 1.52 |
| TCF | N015 | 800 nm | $n_o$ = 1.85 $n_e$ = 1.51 |
| Backlight | Broadband White | | |

TABLE 2

Basic characteristics of the Baseline design.

| Materials | Type | Thickness | Ref. indices |
|---|---|---|---|
| ITO | 100 ohm | 30 nm | 1.85 @ 633 nm |
| PI | | 70 nm | 1.653 |
| LC | MLC-7700-100, 2 deg. pre-tilt, 1.45 V-2.5 V multiplex, 1/4 duty cycle, 7.6 micron cell gap | | |
| Glass | | 0.7 mm | 1.52 |
| External Polarizer | High Efficiency | 25 micron | $n_o$ = 1.52 $n_e$ = 1.52 |
| Backlight | Broadband White | | |

TABLE 3

Basic characteristics of the second Optiva design.

| Materials | Type | Thickness | Ref. indices |
|---|---|---|---|
| ITO | 100 ohm | 30 nm | 1.85 @ 633 nm |
| SiO$_2$ | | 70-80 nm | 1.57 @ 633 nm |
| PI | | 70-80 nm | 1.653 |
| LC | MLC-7700-100, 1 deg. pre-tilt, 1.4 V-2.42 V multiplex, 4.5 micron cell gap, first minimum | | |
| Glass | | 0.7 mm | 1.5 |
| TCF | N021.00 | 400 nm | $n_o$ = 1.95 $n_e$ = 1.51 |
| Backlight | LED | 589 nm peak | 30 nm bandwidth |

Figure 8:
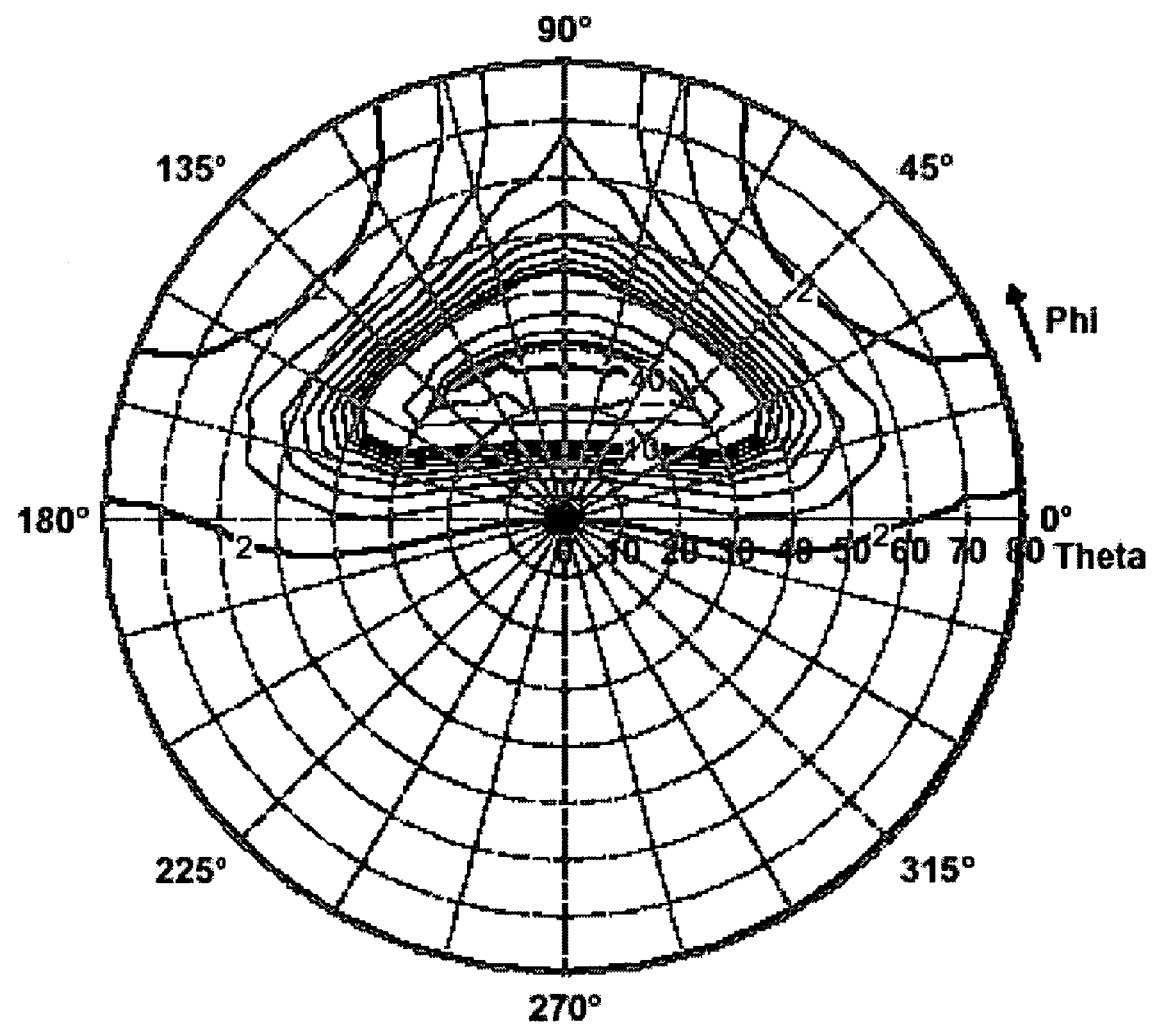
FIGS. 8-10 are polar iso-contrast plots of the liquid crystal displays in accordance with the present invention.
Figure 9:
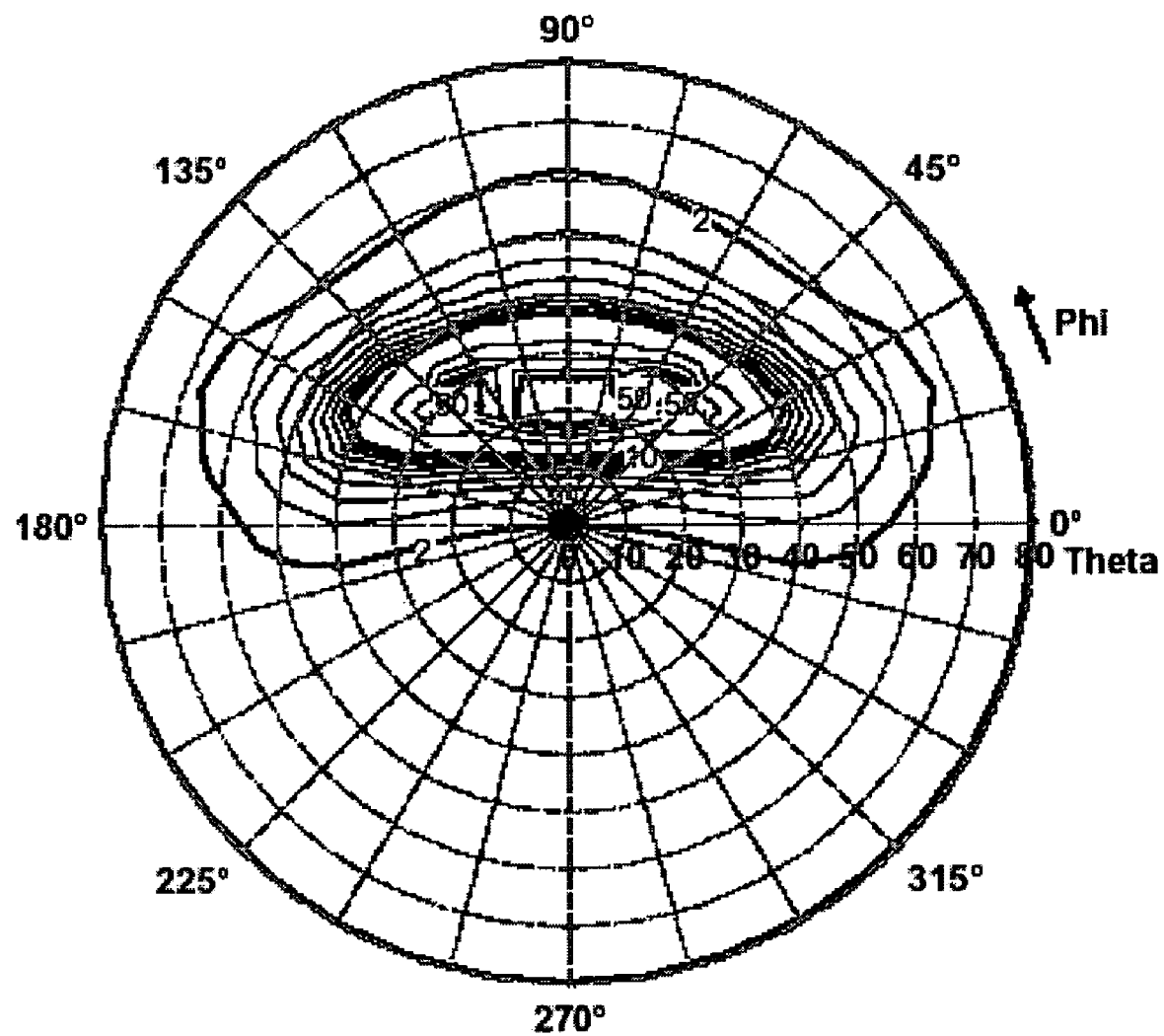
Figure 10:
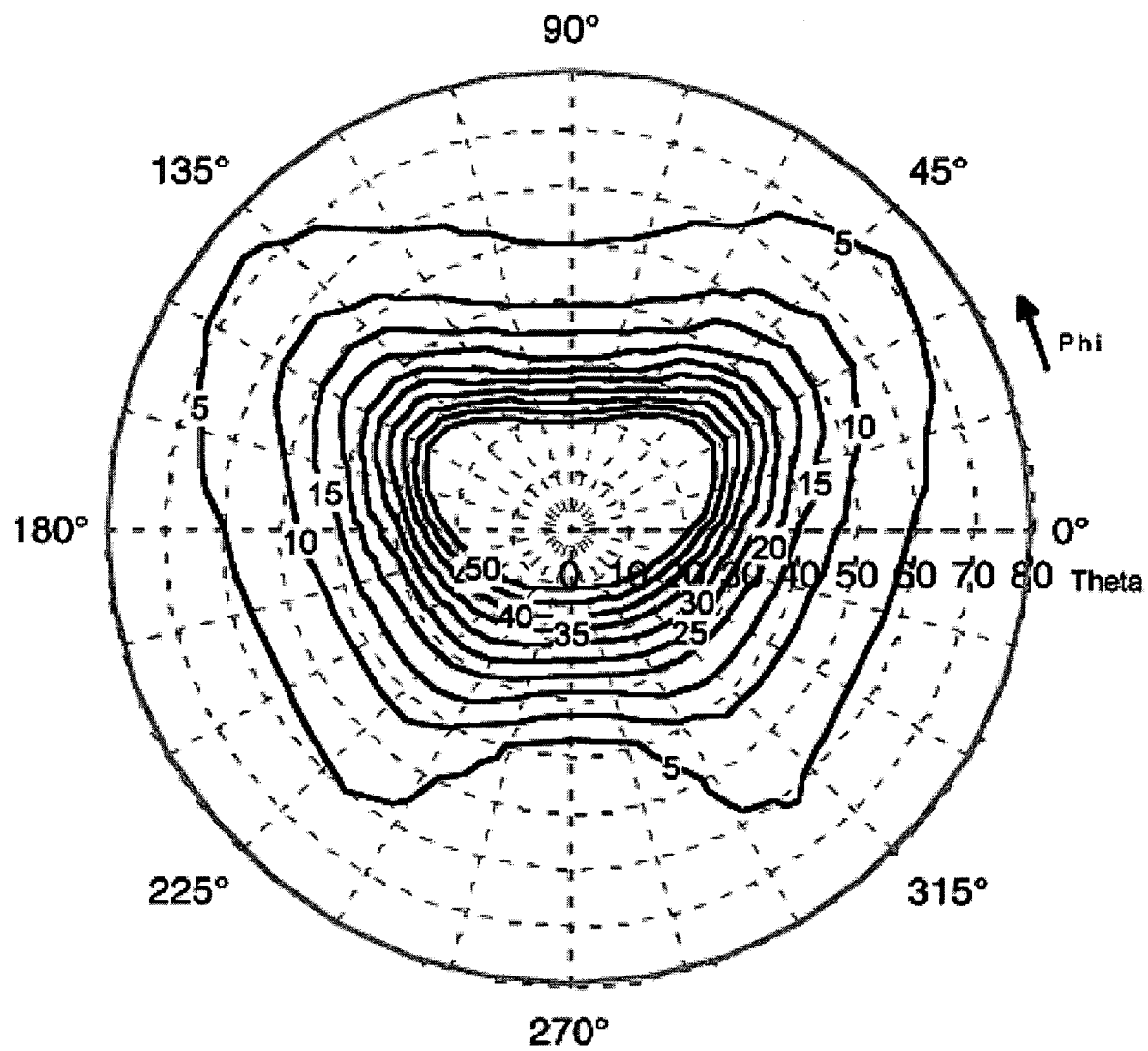

The obtained angular dependencies of the LCD photopically-weighted contrast ratio are shown in FIGS. 8, and 10 for the first, second and third examples, respectively. All FIGS. demonstrate the maximum contrast ratio higher than 40 at the azimuth angle from 15° up to 35°. A comparison of FIG. 8 and FIG. 9 clearly reveals that the use of internal TCF polarizers available from Optiva, Inc. increases the viewing angle of the device and enhances the offset of the viewing cone in the selected direction.

The foregoing descriptions of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

What is claimed is:

1. A method of using a liquid crystal display comprising:
a front panel comprising a front alignment layer having an alignment direction;
a rear panel comprising a rear alignment layer having an alignment direction; and
a liquid crystal layer between the front and rear alignment layers;
wherein at least one of the front and rear panels further comprises a polarizer, said polarizer comprising a thin crystal film manufactured from a plurality of aromatic organic compounds, and the interplanar distance of the thin crystal film in the direction of any optical axis is 3.4±0.3 Å
wherein the liquid crystal layer has a rotational twist angle of about 90°, a pre-tilt angle of not more than 2°; and
the method comprising the step of setting the direction of liquid crystal directors coinciding with an off-normal viewing direction of the liquid crystal display at the mid-point of the rotational twist when a voltage is applied to the liquid crystal layer by selecting the alignment, material and thickness of the liquid crystal layer whereby a maximum image contrast is achieved in the off-normal viewing direction,
wherein the direction of the liquid crystal directors coincides with an off-normal viewing direction in the range of an azimuth angle of from 15 to 35 degrees in the voltage-on state and the contrast becomes the largest in such a direction.

2. The method of claim 1 wherein the front panel further comprises a front polarizer, and the rear panel further comprises a rear polarizer.

3. The method of claim 2 wherein the transmission axes of the front and rear polarizers are perpendicular.

4. The method of claim 2 wherein the transmission axes of the front and rear polarizers are parallel.

5. The method of claim 2 wherein at least one of front and rear polarizers is E-type polarizer, and the transmission axis of the E-type polarizer and the alignment direction of the alignment layer in the same panel as the E-type polarizer are perpendicular.

6. The method of claim 5 wherein the E-type polarizer is a thin crystal film manufactured from aromatic organic compounds, and the interplanar distance of the thin crystal film in the direction of any optical axis is 3.4±0.3 Å.

7. The method of claim 6 wherein at least one of the aromatic organic compounds contains heterocycles.

8. The method of claim 6 wherein the thin crystal film is formed from a lyotropic liquid crystal based on at least one dichroic dye.

9. The method of claim 8 wherein the thin crystal film is treated with ions of bi-or/and trivalent metals.

10. The method of claim 2 wherein the front and rear polarizers are O-type polarizers.

11. The method of claim 10 wherein the transmission axis of the front O-type polarizer is parallel to the alignment direction of the front alignment layer, and the transmission axis of the rear O-type polarizer is parallel to the alignment direction of the rear alignment layer.

12. The method of claim 2 wherein the transmission axis of the front polarizer and the alignment direction of the front alignment layer form an angle from 0° to 90°.

13. The method of claim 2 wherein the transmission axis of the rear polarizer and the alignment direction of the rear alignment layer form an angle from 0° to 90°.

14. The method of claim 2 wherein at least one of the front and rear polarizers is an internal polarizer.

15. The method of claim 14 wherein the internal polarizer has at least one of the functions selected from the group consisting of an alignment layer, color correction filter, retarder, and any combination thereof.

16. The method of claim 1 further comprises a reflective layer.

17. The method of claim 16 wherein the reflective layer is semitransparent.

18. The method of claim 17 further comprises a backlighting system.

19. The method of claim 1 further comprises an antireflection or antiglare layer.

20. The method of claim 1 further comprises a light-scattering layer.

21. The method of claim 1 further comprises a retarder layer, a protective layer, an adhesive layer, a color filter, or a layer combining functions of at least two of the said layers.

22. The method of claim 1 wherein the off-normal viewing direction is in the range of 15° to 35° in azimuth angle, and in this range, the maximum contrast ratio is not lower than 40.

* * * * *